Nov. 27, 1934. L. M. SAWIN 1,982,073
APPARATUS FOR TREATING NUT MEATS
Filed Aug. 14, 1933
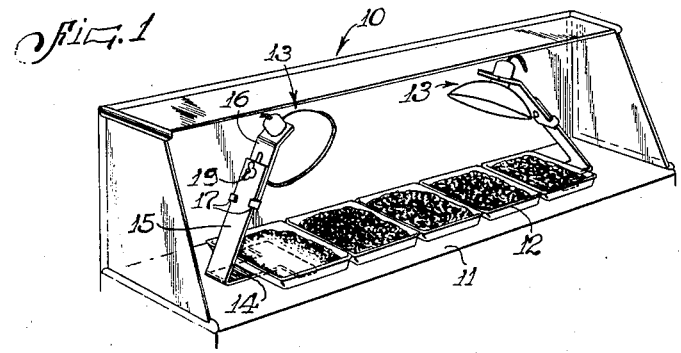
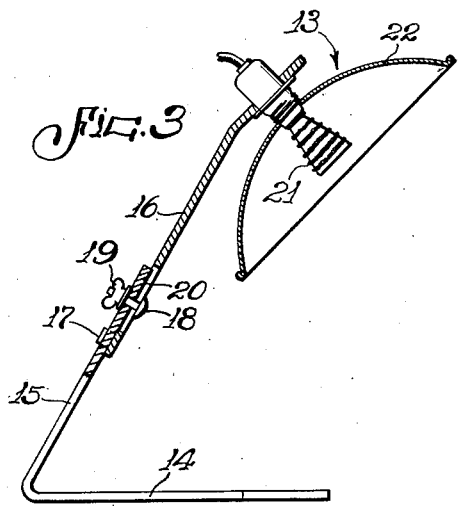
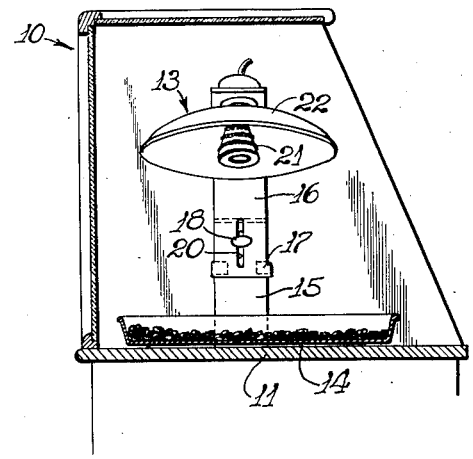
Inventor
Lester M. Sawin
Attorneys Patented Nov. 27, 1934

1,982,073

UNITED STATES PATENT OFFICE 1,982,073

APPARATUS FOR TREATING NUT MEATS

Lester M. Sawin, Chicago, Ill.; Emilyn J. Sawin, administratrix of said Lester M. Sawin, deceased, assignor to The Susu Nut Company, Chicago, Ill., a corporation of Illinois Application August 14, 1933, Serial No. 685,051

1 Claim. (Cl. 219—34)

The invention relates generally to an apparatus for treating toasted nut-meats, and more particularly to an apparatus for use in treating previously toasted nut-meats while on display for sale. For the sake of brevity, the term "nuts" will be hereinafter used to denote nut-meats.

The primary object of the invention is to provide a display apparatus of an advantageous character whereby nuts previously prepared by toasting in an edible oil may be restored to their original state of freshness and maintained in such condition while on display.

In the preparation of nuts for retail distribution, it is desirable that they be heated in order to restore them to the condition which they were in when initially prepared at the factory. In most instances, the nuts are seasoned by the application thereto of salt either at the factory or in the retailer's shop. In preparing the nuts for sale, a common practice employed by retailers has been to place the nuts in a heated container which is equipped with agitating means for the purpose of effecting a uniform distribution of heat to the nuts. This method of treatment has proven objectionable for the reason that when the nuts are agitated while being heated, the salt constitutes an abrasive agent, with the result that the skins of some of the nuts, such as pecans, are removed in part, and further the nuts become pitted and acquire an unsightly and a generally unsalable condition.

With this difficulty in view, a further object of my invention is to provide an improved display apparatus for nuts having provision for restoring the nuts to their original freshness by the application of heat thereto in a manner such as to avoid the injurious agitation referred to.

Another object is to provide a display apparatus embodying a substantially closed display chamber for the nuts and means of an advantageous character for applying radiant heat substantially uniformly over the top surface area of the nuts when placed within a series of contiguous trays in said chamber.

A further object is to provide a display apparatus including means for applying radiant heat over the top surface area of the nuts when placed within a series of contiguous trays, which means is adjustable so that the intensity of the heat may be varied in accordance with the length of time that nuts may remain under the heat before being sold.

Other objects and advantages will become apparent from the following description taken in connection with the accompanying drawing, in which:

Figure 1 is a perspective view of apparatus embodying the features of the invention.

Fig. 2 is an enlarged vertical section of the apparatus.

Fig. 3 is an enlarged elevational view, partially in section, of one of the heating devices.

As shown in the drawing, the apparatus comprises a display case, indicated generally at 10, which is adapted to be supported upon a counter or other suitable surface in a retail shop. The case is formed by a base 11 supporting front, end and top walls. The walls are preferably made of glass to render visible the nuts on display within the case. The rear side of the case is open to permit of ready access to the interior and to let the air circulate within the case without undue drafts. On the base 11 are positioned a row of trays 12, separate trays being preferably used so that the various kinds of nuts may be displayed at the same time and so that any one tray may be readily replaced.

In practice, the nuts, as supplied to the retailer, have previously been prepared by toasting in an edible oil. However, as an incident to the cooling of the nuts, the oil becomes absorbed by the nuts, and the nuts therefore acquire a dull unattractive appearance. Where the nuts as supplied have not been seasoned with salt, the retailer usually supplies the salt and effects its distribution by stirring the nuts gently within the trays.

To restore the nuts to their original freshness, means is provided for applying heat thereto, and preferably the means employed for this purpose is in the form to supply radiant heat such as one or more heaters 13 positioned within the display case over the trays 12, and so designed as to effect a substantially uniform distribution of the heat to the top layer of nuts within the trays. It is to be observed in this connection that the nuts are spread out so as to form a relatively large top surface area which is exposed to the heat, and the temperature maintained at the surface of the nuts is not sufficiently high as to burn them. As a result of such application of heat to the nuts, the original fresh condition and oily appearance is restored thereto. In the present instance, two heaters 13 are employed, positioned adjacent the respective ends of the row of trays.

The heaters 13 are preferably adjustable so that the intensity of the heat on the nuts may be varied. Thus, if the sale of nuts increases, the intensity of the heat may be increased to speed up the heating, or if the demand for the nuts falls off, the intensity may be decreased to slow up the process. In the present instance, the variation in intensity is effected by a movement of the heater toward and away from the nuts.

Each heater, in its preferred form, comprises a standard having a base portion 14 preferably made of sheet metal and cut in the form of a T which rests on the base of the show case and is inserted under the end tray, as illustrated in Fig. 1. Bent upwardly and obliquely from the base portion 14 is an integral upright 15 to which is adjustably attached an extension 16 so that the heater may be moved toward and from the nuts to vary the intensity of the heat. In order that the extension 16 may be clamped in any adjusted position, it is provided with a pair of clips 17 bent over the edges of the upright 15 and a screw 18 and wing nut 19 extend through the upright 15 and an elongated slot 20 in the extension 16 to clamp the two parts together.

On the upper end of the extension 16 is mounted a heating element 21 preferably electrically operated, which is surrounded by a reflector 22 for directing the heat downwardly on and obliquely along the row of trays. Thus, heat will be directed to the nuts in the various trays.

By using heaters of this type, any number of trays that may be conveniently placed within the show case may be used, and the heaters and trays may be readily shifted about as occasion demands.

The apparatus permits of imparting heat to the nuts in a uniform manner to avoid underheating or overheating a part of the nuts, the intensity of heat being capable of being varied by adjustment of the standards supporting the heating elements. The device has an attractive appearance for display purposes since the trays are neatly arranged in the case and the glow from heaters tends to attract notice of the customers.

I claim as my invention:

A device for heating nuts in a tray comprising, in combination, a standard made of sheet metal comprising a base portion adapted to be inserted under the tray, an integral portion bent to extend upwardly and obliquely toward the tray, and an extensible member adjustably secured to said bent portion, a heating element mounted on the upper end of said extensible member, and a reflector for said heating element positioned to direct heat downwardly and obliquely onto the nuts.

LESTER M. SAWIN.